United States Patent
Näsman

(10) Patent No.: US 11,283,675 B2
(45) Date of Patent: Mar. 22, 2022

(54) SYSTEM AND METHOD FOR MAINTENANCE OF ELECTRONIC PROGRAMMABLE DEVICES

(71) Applicant: IT-taxi Oy, Klaukkala (FI)

(72) Inventor: Markus Näsman, Klaukkala (FI)

(73) Assignee: IT-TAXI OY, Klaukkala (FI)

( * ) Notice: Subject to any disclaimer, the term of this patent is extended or adjusted under 35 U.S.C. 154(b) by 519 days.

(21) Appl. No.: 15/613,799

(22) Filed: Jun. 5, 2017

(65) Prior Publication Data
US 2018/0351794 A1    Dec. 6, 2018

(51) Int. Cl.

| | |
|---|---|
| H04L 41/0803 | (2022.01) |
| G06F 8/65 | (2018.01) |
| H04L 67/10 | (2022.01) |
| H04L 41/00 | (2022.01) |
| G06F 11/22 | (2006.01) |
| G06Q 10/00 | (2012.01) |

(52) U.S. Cl.
CPC ............ *H04L 41/0803* (2013.01); *G06F 8/65* (2013.01); *G06F 11/2221* (2013.01); *G06F 11/2294* (2013.01); *H04L 41/20* (2013.01); *H04L 67/10* (2013.01); *G06Q 10/20* (2013.01)

(58) Field of Classification Search
CPC ..... H04L 41/0803; H04L 41/20; H04L 67/10; G06F 8/65; G06F 11/2221; G06F 11/2294
See application file for complete search history.

(56) References Cited

U.S. PATENT DOCUMENTS

| | | | |
|---|---|---|---|
| 7,092,790 B2 * | 8/2006 | Sudolcan | B67D 1/0022 700/239 |
| 7,454,606 B2 | 11/2008 | Marquiz | |
| 9,283,672 B1 | 3/2016 | Matthews et al. | |
| 9,452,884 B2 | 9/2016 | Rutledge et al. | |
| 9,948,411 B2 * | 4/2018 | Diperna | H04B 17/11 |
| 10,158,552 B2 * | 12/2018 | Doshi | H04L 43/50 |

(Continued)

FOREIGN PATENT DOCUMENTS

JP    2006209194 A    8/2006

OTHER PUBLICATIONS

International Search Report and Written Opinion received for International Application No. PCT/FI2018/050414, dated Aug. 14, 2018, 16 pages.

*Primary Examiner* — Philip J Chea
*Assistant Examiner* — Robert B McAdams
(74) *Attorney, Agent, or Firm* — Ziegler IP Law Group, LLC

(57) ABSTRACT

A system for maintenance of electronic programmable devices. The system includes a cabinet having at least a first compartment and a second compartment. The first compartment includes a first communication interface, a second communication interface and a third communication interface configured to be connected to different electronic programmable devices. The system further includes a cabinet server installed in the second compartment; a communication module configured to connect the cabinet server to a remote computer or to a remote server, and configured to connect the electronic programmable device to the remote computer or to the remote server; and a cabinet communication network configured to connect the electronic programmable device to the cabinet server.

11 Claims, 6 Drawing Sheets

(56) References Cited

U.S. PATENT DOCUMENTS

| | | | |
|---|---|---|---|
| 2006/0267936 A1* | 11/2006 | Hoerl | G06F 3/023 |
| | | | 345/158 |
| 2009/0265035 A1* | 10/2009 | Jenkinson | B25J 9/1697 |
| | | | 700/259 |
| 2012/0087074 A1* | 4/2012 | Chen | G06F 1/1632 |
| | | | 361/679.02 |
| 2016/0076992 A1* | 3/2016 | Gillespie | G01N 21/01 |
| | | | 356/244 |
| 2016/0187876 A1 | 6/2016 | Diperna et al. | |
| 2017/0033579 A1 | 2/2017 | Maguire et al. | |

* cited by examiner

SYSTEM AND METHOD FOR MAINTENANCE OF ELECTRONIC PROGRAMMABLE DEVICES

TECHNICAL FIELD

The present disclosure relates generally to maintenance of computing devices; and more specifically, to systems and methods for remote maintenance of electronic programmable devices.

BACKGROUND

People nowadays have become highly dependent on electronic programmable devices, such as laptops, smartphones, tablets, and the like, for various purposes, for example communication, entertainment navigation, and so forth. However, such electronic programmable devices may require periodic maintenances due to software upgrades. Moreover, with time or due to extensive usage such electronic programmable devices may become partly or totally inoperable and thus require maintenance.

Generally, such faulty electronic programmable devices are physically submitted to a service or repair station, or service personnel may be called for the maintenance thereof. However, such approaches are subject to various problems like time constraints, availability of resources and so forth. Alternatively, such faulty devices may be maintained or repaired remotely by providing control of such devices to a technical expert. Typically, remote control of such faulty devices may be provided by using software applications, for example, Teamviewer, Netop Remote Control, NetSupport Manager and so forth. Therefore, a user (or owner) of such devices has to be technically skilled to handle such software applications in order to provide the remote access to the technical experts. Furthermore, in order to do so a dedicated internet connection is required between the faulty devices and a device of the technical expert to enable the technical expert to remotely perform the required maintenance actions. Moreover, the internet connection should be reliable and of adequate bandwidth to allow the maintenance in an undisrupted way.

Therefore, in light of the foregoing discussion, there exists a need to overcome the aforementioned drawbacks associated with conventional techniques of maintenance of electronic programmable devices.

SUMMARY

The present disclosure seeks to provide a system for maintenance of electronic programmable devices. The present disclosure also seeks to provide a method for providing maintenance for an electronic programmable device. The present disclosure seeks to provide a solution to the existing problem of inefficient maintenance of electronic programmable devices. An aim of the present disclosure is to provide a solution that overcomes at least partially the problems encountered in prior art, and provides an easy and reliable way of maintenance of electronic programmable devices.

In one aspect, an embodiment of the present disclosure provides a system for maintenance of electronic programmable devices, comprising
   a cabinet having at least a first compartment and a second compartment;
   the first compartment comprising a first communication interface, a second communication interface and a third communication interface configured to be connected to an electronic programmable device;
   a cabinet server installed in the second compartment;
   a communication module configured to connect the cabinet server to a remote computer or to a remote server, and configured to connect the electronic programmable device to the remote computer or to the remote server; and
   a cabinet communication network configured to connect the electronic programmable device to the cabinet server.

In another aspect, an embodiment of the present disclosure provides a method for providing maintenance for an electronic programmable device, the method comprising steps of
   connecting the electronic programmable device to a maintenance system;
   accessing keyboard and display ports of the electronic programmable device with a remote computer or a remote server;
   performing remote maintenance operations via the keyboard and display ports; and
   providing software for the electronic programmable device from a cabinet server of the maintenance system.

Embodiments of the present disclosure substantially eliminate or at least partially address the aforementioned problems in the prior art, and provides efficient systems and methods for maintenance of electronic programmable devices.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those experienced in the art will understand that the drawings are not to scale and could be modified in simpler and more complex varieties. Wherever possible, identical or similar elements have been indicated by identical numbers.

Embodiments of the present disclosure will now be described, by way of example only, with reference to the following diagrams wherein.

Figure 1:
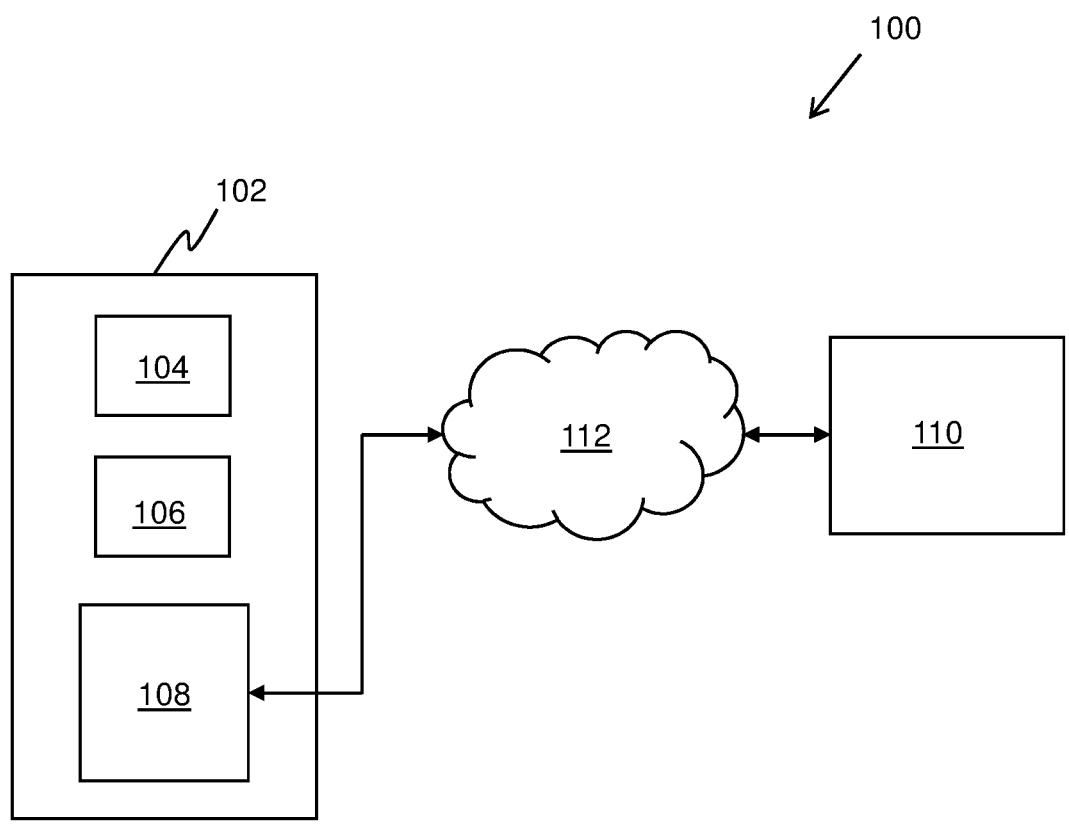
FIG. 1 is a block diagram of a system for maintenance of electronic programmable devices, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is not underlined and accompanied by an associated arrow, the not underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system for maintenance of electronic programmable devices, comprising
  a cabinet having at least a first compartment and a second compartment;
  the first compartment comprising a first communication interface, a second communication interface and a third communication interface configured to be connected to an electronic programmable device;
  a cabinet server installed in the second compartment;
  a communication module configured to connect the cabinet server to a remote computer or to a remote server, and configured to connect the electronic programmable device to the remote computer or to the remote server; and
  a cabinet communication network configured to connect the electronic programmable device to the cabinet server.

In another aspect, an embodiment of the present disclosure provides a method for providing maintenance for an electronic programmable device, the method comprising steps of
  connecting the electronic programmable device to a maintenance system;
  accessing keyboard and display ports of the electronic programmable device with a remote computer or a remote server;
  performing remote maintenance operations via the keyboard and display ports; and
  providing software for the electronic programmable device from a cabinet server of the maintenance system.

The system and method of the present disclosure provide a hassle free maintenance for electronic programmable devices. The present disclosure employs a remote computer or a remote server for remotely performing the maintenance. Beneficially, for performing maintenance of an electronic programmable device, neither the device is required to be physically submitted in a service station nor a service personnel is required to be called in person, and thus maintenance is executed in a time efficient way. Furthermore, a technically novice or untrained user (or owner of the electronic programmable devices) can simply make appropriate connections of communication interfaces of the cabinet and the electronic programmable devices to get the electronic programmable device repaired. Moreover, a reliable internet connection between the cabinet and the remote computer or the remote server enhances the reliability of maintenance of the electronic programmable devices.

The cabinet includes at least the first compartment and the second compartment. According to an embodiment, the first compartment is different from the second compartment based on functionality associated therewith. For example, the first compartment, unlike the second compartment, may be configured to receive an electronic programmable device upon which some maintenance function needs to be performed. Furthermore, functional elements associated with the first compartment and the second compartment may be different from each other. For example, the first compartment accommodates various functional elements, such the first, the second and the third communication interfaces, however the second compartment accommodates functional elements such as the cabinet server, the communication module and the cabinet communication network, which are explained in detail herein later.

In an embodiment, the cabinet may include any number of the first and second compartments. For example, the cabinet may include multiple first compartments and a single second compartment. Alternatively, the cabinet may include same number of the first and second compartments.

In an embodiment, the cabinet may be configured to have various structural configurations. For example, the first and second compartments may be configured to be aligned vertically, horizontally or diagonally. Therefore, the cabinet may be configured to have a shape, which includes but not limited to cubical, cuboidal, cylindrical, and so forth. Furthermore, dimensions of first and second compartments may be same or different. Moreover, the cabinet may be made of a suitable material, such as wood, metal, plastic, glass or any combination thereof. Additionally, the cabinet includes at least one recess or opening to allow cables or wires to pass through. In an example, the cables or wires may include an electrical wire to draw power from an external power source.

According to an embodiment, the electronic programmable device may include but not limited to a portable computing device, such as a laptop, a smartphone, a tablet, and so forth.

The first compartment also comprises the first communication interface, the second communication interface and the third communication interface configured to be connected to the electronic programmable device.

In an embodiment, the first, the second and the third communication interfaces are operatively associated with a remote interface unit. For example, the first, the second and the third communication interfaces extend from the remote interface unit and may connected to different types of electronic programmable device.

In an embodiment, the first communication interface is configured to provide access for the remote computer to a keyboard port of the electronic programmable device. According to an embodiment, the first communication interface includes general components such as cable, connector, connector adapter and so forth. For example, the first communication interface may be a Universal Serial Bus (USB) interface between the electronic programmable device and the remote computer. Furthermore, the USB interface may be of different sizes such as standard, mini, micro and so forth. In one embodiment, the USB interface is operable to provide both communication and power supply to the electronic programmable device. The first communication interface enables the remote computer to provide maintenance input and/or instruction to the electronic programmable device through the remote computer.

In an embodiment, the second communication interface is configured to provide access for the remote computer to a display port of the electronic programmable device. In an embodiment, the second communication interface relates to a digital display interface between the electronic programmable device and the remote computer. The second communication interface includes general components such as cable, connector, connector adapter and so forth. For example, the second communication interface may include one of Video Graphics Array (VGA) connector, Digital Visual Interface (DVI) connector, High-Definition Multimedia Interface (HDMI) connector and so forth. The second communication interface provides access to a display of the electronic programmable device to the remote computer or the remote server. Specifically, the second communication interface enables the remote computer to access a user interface that is present on the display of the electronic communication device.

According to an embodiment, a KVM-over-IP (Keyboard, Video and Mouse over Internet Protocol) switch can be used to connect the electronic programmable device. According to an embodiment, the first and the second communication interfaces are implemented with KVM-over-IP switch.

In an embodiment, the third communication interface is configured to provide access for the electronic programmable device to the cabinet communication network. The third communication interface enables the electronic programmable device to access Internet or World Wide Web. For example, the third communication interface may be an Ethernet cable. Additionally, the Ethernet cable may be of various types such as Ethernet crossover cable, Ethernet over twisted pair, Ethernet Category 3 cable and so forth. Therefore, the third communication interface may provide access for the electronic programmable device to a global computer network. Additionally the third communication interface might be a wireless interface such as a wireless local area network (Wi-Fi).

In an embodiment, the first and the second communication interfaces are arranged to be physically connected via a single connector such as a USB-C or a thunderbolt connector. Further the third communication interface can be arranged to be physically connected to the other interfaces via a single connector such as a USB-C or a thunderbolt connector.

In an embodiment, a camera is installed in the first compartment. In an embodiment, the camera is configured to produce multimedia content related to the user interface of the electronic programmable device and to provide the multimedia content for the remote computer or for the remote server. Examples of the multimedia content may include a video stream, graphic(s), or a combination thereof. In an example, the camera may be a digital camera, a video recorder, such as a webcam. The camera is configured and operable to capture a status of the user interface of the electronic programmable device (accommodated in the first compartment) to produce the multimedia content and how the device is connected. In one embodiment, the status may be associated with functioning and non-functioning states of the electronic programmable device. For example, the camera may produce a multimedia content, for the remote computer, depicting whether boot sequence is correct or not.

In an embodiment, the camera is operationally coupled to the cabinet server through the cabinet communication network. Accordingly, the camera monitors the user interface (or display and caballing) of the electronic programmable device, and transmits the captured multimedia content, to the cabinet server. In one embodiment, the cabinet server stores and/or transfers the received multimedia content to the remote computer or the remote server. Further, the multimedia content is transmitted, to the remote computer or the remote server in a periodic manner or in a real time fashion. Furthermore, the camera can be 360 degrees camera. Further, the multimedia content can be viewed using a virtual reality display. According to an alternative embodiment, the camera can be an Internet Protocol camera, which is can be accessed from Internet.

In an embodiment, the first compartment further comprises a robotic arm configured to use a keyboard or a touch screen of the electronic programmable device. According to an embodiment, the robotic arm (or hand) is an electromechanical arm configured to follow programmable instructions. In an example, one end of the robotic arm may be fixed within the first compartment while other end of the robotic arm may include a human finger shaped structure. The finger shaped structure is utilized to perform similar functions as human fingers. Furthermore, the robotic arm is configured to move in any direction, such as, horizontal, vertical, angular and the like. Therefore, the robotic arm may be used for performing various functions such as pressing keyboard buttons, touching or selecting user interface icons on the display of the electronic programmable device, gripping an object within the first compartment, pushing the object, lifting the object and so forth.

In an embodiment, the robotic arm is used to press one or more buttons on the keyboard or using the robotic arm to provide touch for a touchscreen of the electronic programmable device. In an example, the robotic arm, receives the commands or instructions to physically press keyboard buttons or perform touch or multi-touch operation on the user interface. For example, pressing of function (Fn) key and function 9 (F9) key at the same time to open mission control in Mac OS environment, or pressing of control, alt and delete keys to logoff in Windows platform, and the like.

In an embodiment, movement of the robotic arm is performed, by receiving the command, from the remote computer or the remote server, through the cabinet server. In another embodiment, the robotic arm movement may be controlled by the cabinet server. In an example, the first compartment may include more than one robotic arm. Furthermore, the second compartment of the cabinet may include one or more such robotic arms. In an embodiment, the robotic arm movement is captured by the camera to form the multimedia content. Therefore, such multimedia content may enable depicting whether the robotic arm is making appropriate movement as instructed by the remote computer or the remote server. According to an alternative embodiment, the camera can be used to monitor operation of the robotic arm.

According to an embodiment, as mentioned above, the electronic programmable device is operatively connected to the remote interface unit with the help of the first, the second and the third communication interfaces. For example, the remote interface unit may be an electronic device having a microcontroller, a memory component, and other electronic components. The remote interface unit receives data from the electronic programmable device (with the help of the first, the second and the third communication interfaces). Thereafter, the received data from the electronic programmable device may be transmitted to the remote computer or to the remote server using a communication network therebetween.

In an embodiment, the communication network may be a wired or wireless communication network, which may include Internet or radio network or any combination thereof. According to an embodiment, the communication network between the electronic programmable device and the remote computer or the remote server is configured by the communication module and the cabinet communication network. According to an embodiment, the cabinet communication network includes various components, such as a router and cables, which operatively connect the remote interface unit, the cabinet server and the communication module to each other. Therefore, the cabinet communication network is configured to exchange data between the electronic programmable device and the remote computer or the remote server. Specifically, the router is operatively coupled with the remote interface unit and the cabinet server to transmit data to the remote server or the remote computer with the help of communication module. In a similar fashion, the electronic programmable device receives the data from the remote computer or the remote server. In an embodiment, the router is an example of a networking device; however, any other suitable networking device alone or in combination with the router, can be utilized for such communication.

The communication module is configured to connect the cabinet server to the remote computer or the remote server, and configured to connect the electronic programmable device to the remote computer or to the remote server. In an embodiment, the cabinet server utilizes the communication module to enable the communication with the remote computer or the remote server. In an alternate embodiment, the router can directly utilize the communication module for communicating with the remote computer or the remote server.

The cabinet server is installed in the second compartment. In an embodiment, the cabinet server is operatively coupled with the router, the communication module, the camera, and the robotic arm. In an embodiment, the cabinet server is configured to enable communication among the router, the communication module, the remote interface unit, the electronic programmable device, and the remote computer or the remote server.

In an embodiment, the cabinet server is configured to store software for the electronic programmable device and to provide the software to the electronic programmable device via the cabinet communication network. The cabinet server stores software application that may be communicated to the electronic programmable device through the cabinet communication network. In another embodiment, different types of software application can be stored in the cabinet server. The types of application may include maintenance related applications, such as operating system applications, driver applications, entrainment applications and the like.

In an embodiment, pre-defined commands or instructions are configured on the cabinet server. Upon detection of requirement of maintenance action by the cabinet server, appropriate commands or instructions are issued by the cabinet server, to perform the maintenance of electronic programmable device. In another embodiment, machine-learning mechanisms are implemented in the cabinet server to perform at least part of the maintenance.

In an embodiment, the cabinet server partially performs the maintenance, and escalates or offloads rest of the maintenance to the remote computer or the remote server. In an alternate embodiment, the cabinet server only simply forwards maintenance issue to the remote computer or the remote server, such that entire maintenance operation is performed by the remote computer or the remote server.

In one embodiment, the cabinet server includes a database of technical experts. The database includes information pertaining to various technical experts, and their respective area of expertise. In an example, the information may be provided by the technical experts themselves while registering for providing maintenance services. Furthermore, the information may include technical expert demographic information, past experience, area of expertise, such as, expert in smartphone maintenance, laptop maintenance, OS expert and the like. Therefore, based on the identified issue of the electronic programmable device, the cabinet server selects the appropriate expert, from the database for performing the maintenance operation.

In an exemplary embodiment, the second compartment is configured to have a single cabinet server. However, multiple additional cabinet servers can also be operatively coupled to each other to form the cabinet server of the second compartment. The multiple cabinet servers offer load balancing. In one embodiment, the cabinet server can be configured to operate multiple virtual servers, preferably one for each of the electronic programmable device and/or compartment.

In one embodiment, the cabinet is further configured to have an antenna. The antenna is used as a radio transceiver (or a separate transmitter and a receiver) to send and receive data between the communication module of the cabinet and the remote computer or the remote server. In an embodiment, miniaturized on-chip antenna that offers low power wireless coupling may be utilized.

In an embodiment, the cabinet is configured to have a power source to provide requisite electrical power to various components (such as the electronic programmable device, the first, second and third communication interfaces, the remote interface unit and the like) associated with the cabinet. For example, the power source provides or distributes the electrical power to the various components accommodated by the first and the second compartments of the cabinet. Examples of the power supply include, DC supply, AC supply, switched-mode power supply, programmable power supply, uninterruptible power supply (UPS) and the like.

In an embodiment, the cabinet is further configured to have a lock on a cabinet door, to restrict unauthorised access of the first and second compartments and various components associated therewith. In an example, a lock associated with a door of the first compartment may be an electronic number lock or electromechanical lock. Furthermore, a lock associated with a door of the second compartment may be one of a mechanical lock, an electronic number lock or electromechanical lock. In an embodiment, more than one lock can be employed on the doors of the cabinet. In an embodiment, the lock might be remotely controllable.

In an embodiment, the cabinet further comprises an indicator to indicate a status of the maintenance. The status indicator may include an electronic display configured on the door of the first compartment. In an example, the indicator may present maintenance status as a textual message (such as percentage of completion, estimated completion time and date), a graphical message and the like. In another embodiment, the status indicator may include at least one light emitting diode (LED). Moreover, such LED may be operable to have green colour light indicating completion of maintenance, yellow colour light indicating in-progress, and blue colour indicating maintenance job is not started yet. In one embodiment, combination of different types of status indicators, such as, LEDs, textual message, graphical message and the like, may be utilized in conjunction with the cabinet.

In one embodiment, the status information may be electronically transmitted to a personal computing device of a user or owner of the electronic programmable device under maintenance. Furthermore, the status information transmission is performed periodically or at a particular time.

In an embodiment, the cabinet further comprises a cooling arrangement to maintain the temperature of the compartments, the electronic programmable devices and the components accommodated within the cabinet. For example, the cooling arrangement may be an air or a coolant (such as liquid nitrogen) based cooling arrangement.

In an embodiment, the computer or the remote server is a computing device operatively coupled with the electronic programmable device. For example, the remote computer may be associated with a computing device of a technical expert. Therefore, when the technical expert received a request for maintenance of an electronic programmable device, the technical expert utilizes the computing device to perform the desired maintenance. In an embodiment, such computing device may include but not limited to a laptop or a desktop.

In an embodiment, the remote server may be a cloud computing based arrangement, a distributed computing arrangement, and the like. According to an embodiment, the remote server includes a database of technical experts. Therefore, upon receiving request for maintenance of an electronic programmable device, the remote server selects an appropriate technical expert from the database for the maintenance. In another embodiment, the remote server includes machine learning, artificial intelligence mechanisms so as to automatically perform the maintenance, without the technical expert's intervention.

As mentioned above, another aspect of present disclosure provides the method for providing maintenance for an electronic programmable device. The method comprises steps of connecting the electronic programmable device to the maintenance system, using the camera to observe the user interface of the electronic programmable device, accessing keyboard and display ports of the electronic programmable device with the remote computer or the remote server, performing remote maintenance operations via the keyboard and display ports, and providing software for the electronic programmable device from the cabinet server of the maintenance system.

The various embodiments and variants disclosed above apply mutatis mutandis to the method. It may be appreciated that the maintenance system of the method referrers to the aforesaid system for maintenance of electronic programmable devices. Therefore, the maintenance system of the method is configured and operable to update, repair, restore and configure an electronic programmable device, such as laptop, smartphone and tablet.

According to an embodiment, the method further comprises making a backup of the electronic programmable device within the cabinet server. Specifically, the backup relates to copying data (such as files and/or databases) from the electronic programmable devices and archiving the data within the cabinet server. For example, the cabinet server, before starting maintenance, stores the electronic programmable device memory data, as backup. The backup information is utilized to restore electronic programmable device memory data, after maintenance. For example, before formatting the Windows, data stored at the electronic programmable device is saved as the backup. The saved data can be again restored in the electronic programmable device after maintenance operation.

In an embodiment, maintenance related action is selected from group of updating software of the electronic programmable device, repairing the electronic programmable device, restoring previous status of the electronic programmable device from the backup, and configuring the software of the electronic programmable device. For example, updating the software of the electronic programmable device includes updating the version of MS-Office from MS-Office 2007 to MS-Office 2010. Furthermore, repairing the electronic programmable device includes formatting currently installed operating system version. Moreover, restoring previous status of the electronic programmable device from the backup includes fetching of relevant data from the backup. Additionally, configuring the software of the electronic programmable device includes installing a printer driver or software application, such as Skype™, Microsoft WORD® and the like.

According to an embodiment, the method further comprises using a robotic arm to press one or more buttons on the keyboard or using the robotic arm to provide touch for a touchscreen of the electronic programmable device. It may be appreciated that the robotic arm of the method refers to the aforesaid robotic arm of the system for maintenance of electronic programmable devices.

According to an additional embodiment, the cabinet is a stand alone unit which is can be configured to automatically perform maintenance operations to the electronic programmable devices without network connectivity. The cabinet may further comprise uninterruptable power supply (USP) to ensure that a possible electrical break does not interrupt maintenance and to enable to shut down systems in a controlled manner. According to an embodiment, a printer or 3D printer can be installed in the cabinet.

According to an embodiment, the system enables a BIOS (Basic Input Output System) level connectivity to the electronic programmable device via the first, the second or the third communication interface. The disclosure further enables a self-service model where a user of the electronic programmable device opens a door of a compartment and attaches the device to the first, the second and the third communication interface. The system can be further configured to identify the device and initiate needed maintenance operations automatically. An embodiment further enables provision of a display and keyboards outside of the cabinet for a maintenance person to use.

DETAILED DESCRIPTION OF THE DRAWINGS

Referring to FIG. 1, illustrated is a block diagram of a system 100 for maintenance of electronic programmable devices, in accordance with an embodiment of the present disclosure. As shown, the system 100 includes a cabinet 102. The system 100 also includes at least one electronic programmable device, such as electronic programmable devices 104 and 106, and a cabinet server 108 received in the cabinet 102. The system 100 also includes a remote computer or a remote server 110 communicably coupled to the cabinet server 108 using a communication network 112.

Figure 2:
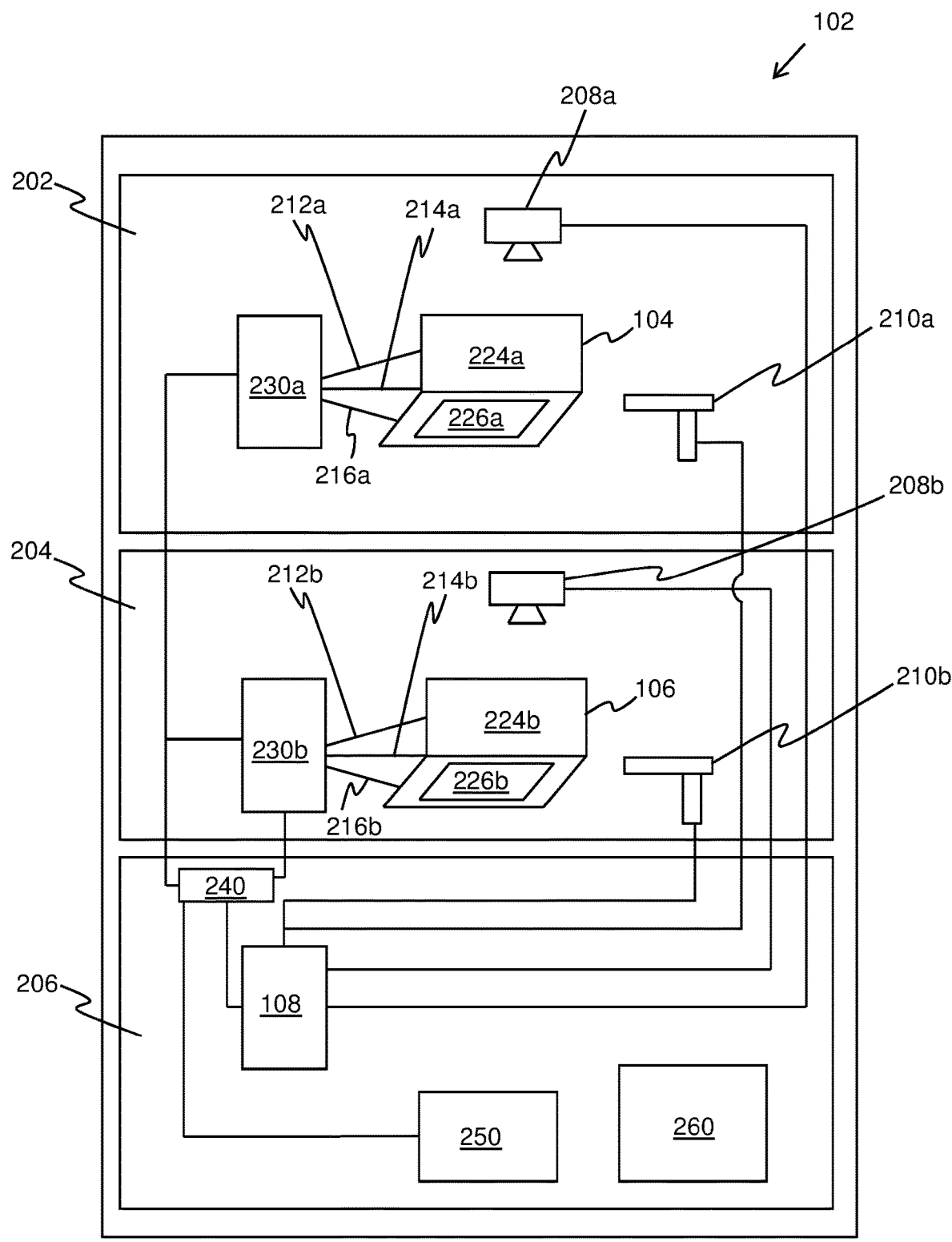
FIG. 2 is a schematic diagram of a cabinet of the system of FIG. 1, in accordance with an embodiment of the present disclosure.

Referring to FIG. 2, illustrated is a schematic diagram of a cabinet, such as the cabinet 102 of the system 100 of FIG. 1, in accordance with an embodiment of the present disclosure. As shown, the cabinet 102 includes at least a first compartment and a second compartment, such as first compartments 202 and 204, and a second compartment 206. The first compartment 202 includes a camera 208a and a robotic arm 210a. The first compartment 202 also includes a first communication interface 212a, a second communication interface 214a and a third communication interface 216a connected to an electronic programmable device, such as the electronic programmable device 104. The electronic programmable device 104 includes a display unit 224a and a keyboard 226a. The first communication interface 212a, the second communication interface 214a and the third communication interface 216a are connected to a remote interface unit 230a.

Similarly, the first compartment 204 includes a camera 208b and a robotic arm 210b. The first compartment 204 also includes a first communication interface 212b, a second communication interface 214b and a third communication interface 216b connected to an electronic programmable device, such as the electronic programmable device 106. The electronic programmable device 106 includes a display unit 224b and a keyboard 226b. The first communication interface 212b, the second communication interface 214b and the third communication interface 216b are connected to a remote interface unit 230b. The second compartment 206 includes a cabinet server, such as the cabinet server 108 of FIG. 1, a router 240, a communication module 250 and a power source 260. It will be appreciated that the router 240 and the communication module 250 constitutes the communication network 112 of FIG. 1. Furthermore, the remote interface units 230a, 230b, the cabinet server 108 and the communication module 250 are operatively connected to the router 240. Moreover, the cabinet server 108 is operatively coupled to the cameras 208a, 208b and the robotic arms 210a, 210b.

Figure 3:
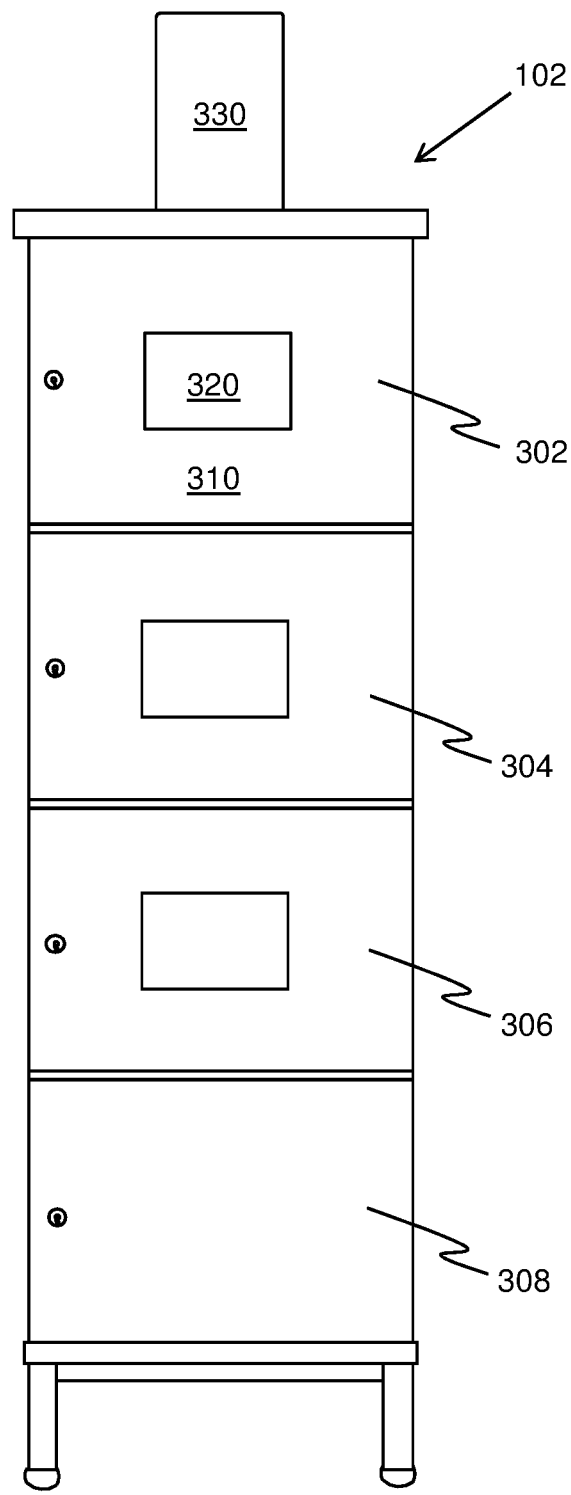
FIG. 3 is a schematic front view of a cabinet of the system of FIG. 1, in accordance with an embodiment of the present disclosure.

Referring to FIG. 3, illustrated is a schematic front view of a cabinet, such as the cabinet 102 of the system 100 of FIG. 1, in accordance with an embodiment of the present disclosure. As shown, the cabinet 102 includes a plurality of compartments, such as compartments 302, 304, 306 and 308. The compartments 302, 304, 306 and 308 include at least a first compartment (such as the first compartments 202, 204 of FIG. 2), and a second compartment (such as the second compartments 206 of FIG. 2). Each of the compartments 302, 304, 306, 308 includes a door, such as a door 310 (shown in a locked state). Furthermore, a first compartment, such as the compartment 302, includes an indicator 320 for depicting maintenance status of an electronic programmable device received in the first compartment 302. The cabinet 102 also includes an antenna 330.

Figure 4:
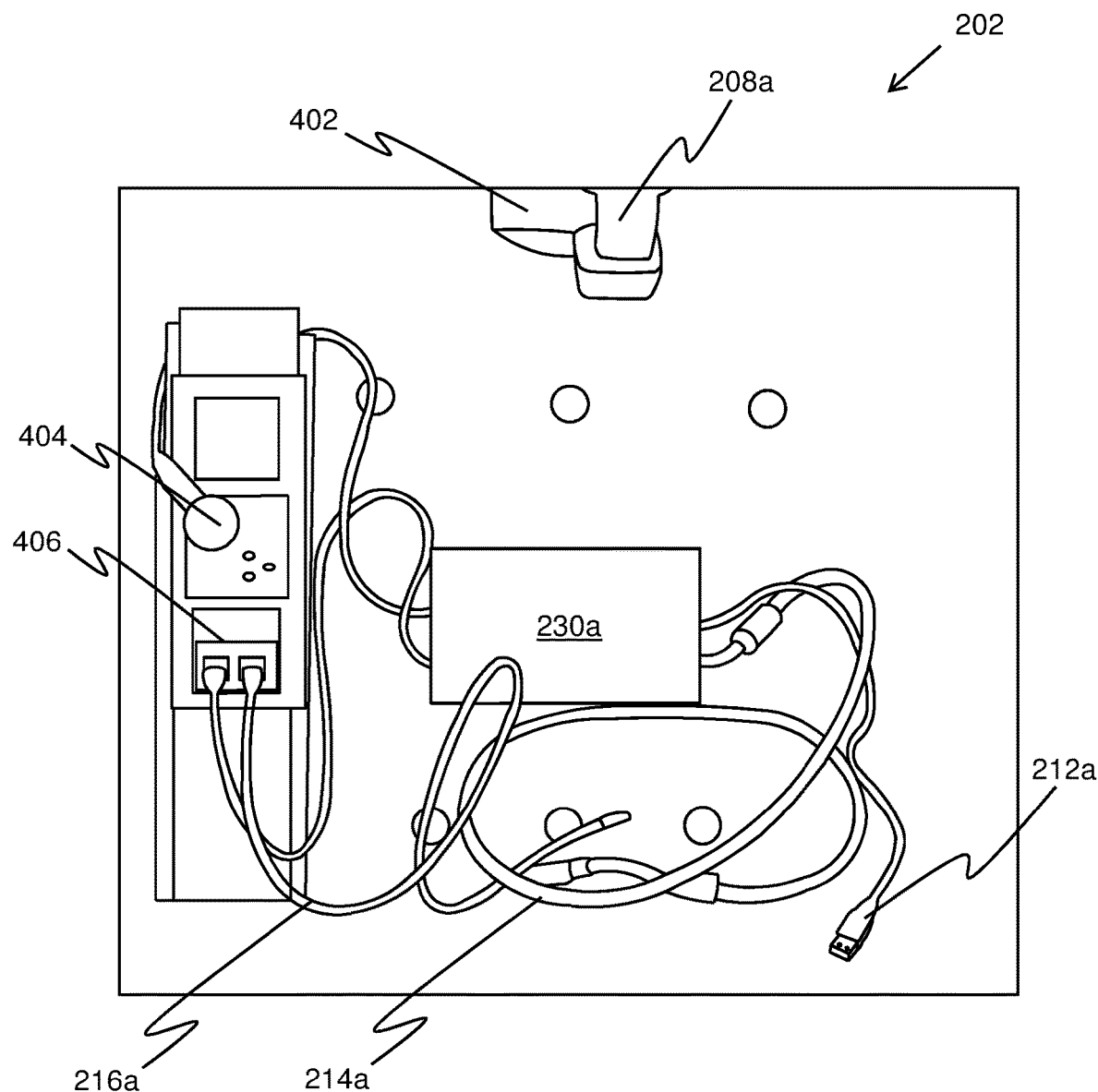
FIG. 4 is a schematic front view of a first compartment of the cabinet of FIG. 3, in accordance an embodiment of the present disclosure.

Referring to FIG. 4, illustrated is a schematic front view of a first compartment, such as the first compartment 202 of the cabinet 102 of FIG. 2, in accordance an embodiment of the present disclosure. As shown, the first compartment 202 includes a first communication interface, such as the 212a, a second communication interface, such as the second communication interface 214a, and a third communication interface, such as the third communication interface 216a. The first compartment 202 also includes a remote interface unit 230a connected to the first, the second and the third communication interfaces 212a, 214a, 216a. The first compartment 202 also includes a camera, such as the camera 208a, a light source 402, a power supply cable 404 and an Ethernet arrangement 406.

Figure 5:
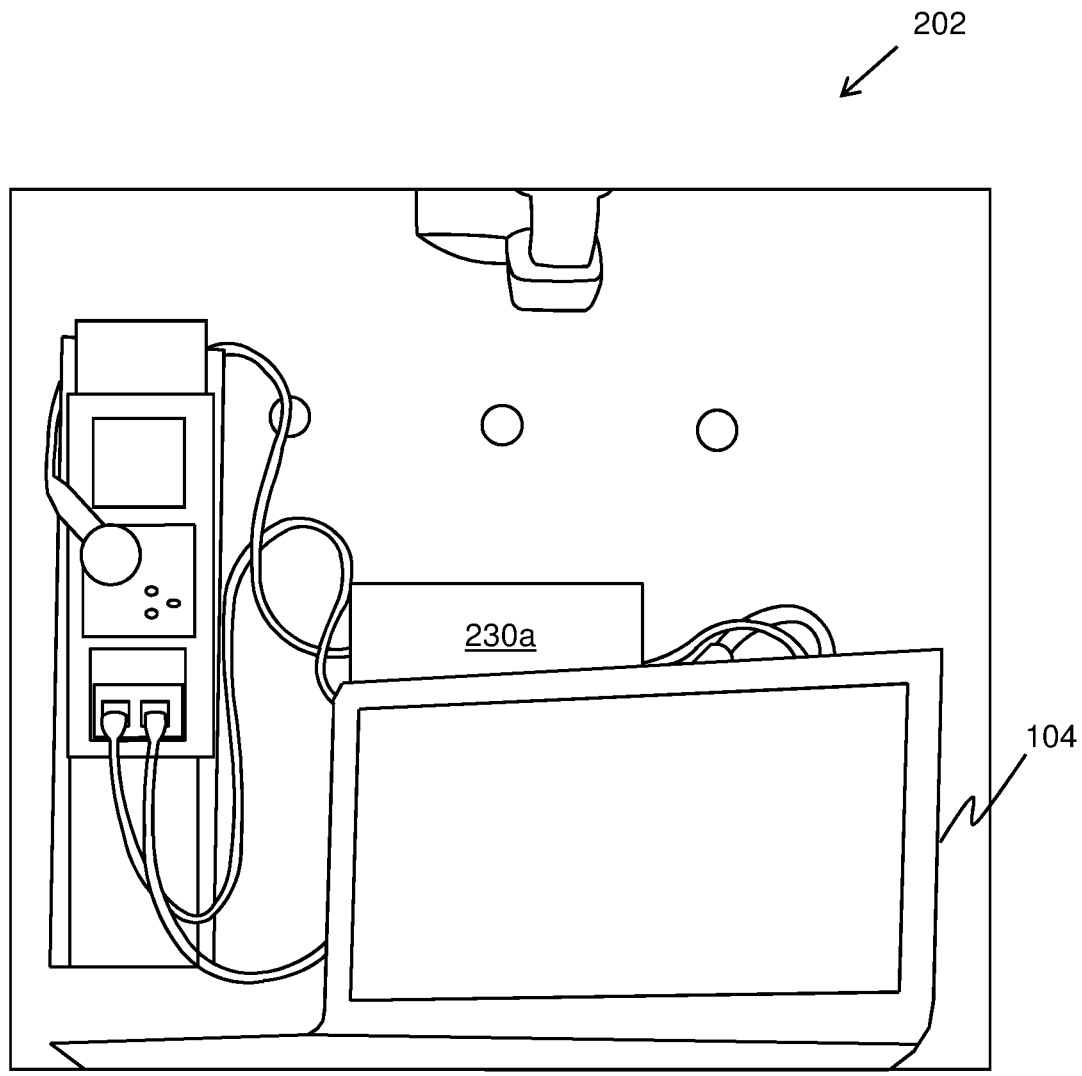
FIG. 5 is a schematic front view of the first compartment of FIG. 4 with an electronic programmable device therein, in accordance an embodiment of the present disclosure.

Referring to FIG. 5, illustrated is a schematic front view of the first compartment 202 of FIG. 4 with an electronic programmable device, such as the electronic programmable device 104 therein, in accordance an embodiment of the present disclosure. The electronic programmable device 104 is connected to the first, the second and the third communication interfaces (such as the first, second and third communication interfaces 212a, 214a, 216a of FIG. 4), which are further connected to the remote interface unit 230a.

Figure 6:
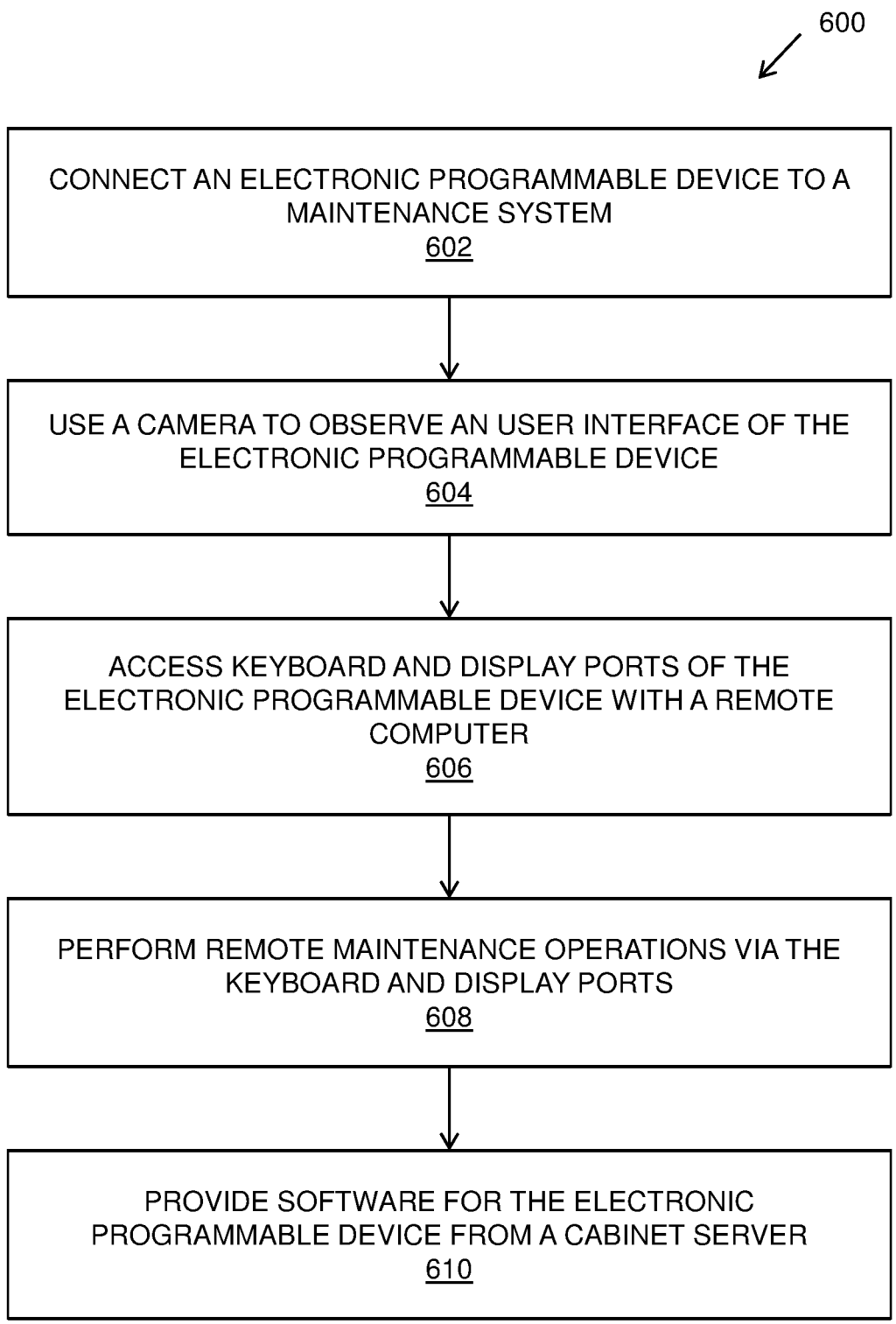
FIG. 6 illustrates steps of a method for providing maintenance for an electronic programmable device, in accordance with an embodiment of the present disclosure.

Referring to FIG. 6, illustrated are the steps of a method 600 for providing maintenance for an electronic programmable device, in accordance with an embodiment of the present disclosure. It will be appreciated that the method 600 is associated with at least use and/or implementation of the aforesaid system 100, described herein above in conjunction with FIGS. 1-5.

At step 602, an electronic programmable device is connected to a maintenance system. At step 604, a camera is used to observe a user interface of the electronic communication device. At step 606, keyboard and display ports of the electronic programmable device are accessed with a remote computer. At step 608, remote maintenance operations are performed via the keyboard and display ports. At step 610, software for the electronic programmable device is provided from a cabinet server.

The steps 602 to 610 are only illustrative and other alternatives can also be provided where one or more steps are added, one or more steps are removed, or one or more steps are provided in a different sequence without departing from the scope of the claims herein. For example, the method 600 further comprises making a backup of the electronic programmable device within the cabinet server. In an example, the method 600 further comprises using a robotic arm to press one or more buttons on the keyboard or using the robotic arm to provide touch for a touchscreen of the electronic programmable device. In another example, in the method 600, maintenance related action is selected from group of updating software of the electronic programmable device, repairing the electronic programmable device, restoring previous status of the electronic programmable device from the backup, and configuring the software of the electronic programmable device.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be constructed in a non-exclusive manner, namely allowing for items, components or elements not explicitly described also to be present. Reference to the singular is also to be constructed to relate to the plural.

The invention claimed is:

1. A cabinet system for maintenance of electronic programmable devices, the cabinet system comprising;
   at least two first compartments, a second compartment and a third compartment in a single cabinet structure, the second compartment being physically separated from the at least two first compartments by a wall member and configured to perform functions different from functions performed by the at least two first compartments, each of the at least two first compartments configured to receive a respective electronic programmable device associated with a maintenance related action and the second compartment configured to house a single cabinet server that is configured to operate a separate virtual server for each of the respective electronic programmable device in the at least two compartments;
   each of the at least two first compartments comprising a first communication interface, a second communication interface and a third communication interface, one side of the first communication interface, the second communication interface and the third communication interface configured to be connected to respective ports of the respective electronic programmable device;

a remote interface unit in each of the at least two first compartments connected to an other side of the first communication interface, the second communication interface and the third communication interface;

the first communication interface configured to provide access for a remote computer to a keyboard port of the respective electronic programmable device, the second communication interface configured to provide access for the remote computer to a display port of the respective electronic programmable device, the third communication interface configured to provide access for the respective electronic programmable device to a cabinet communication network-;

in the second compartment, the cabinet communication network connected to the remote interface unit and configured to connect the first communication interface, the second communication interface and the third communication interface to the cabinet server;

a communication module in the cabinet communication network configured to connect the cabinet server to a remote computer or to a remote server, and configured to connect the respective electronic programmable device to the remote computer or to the remote server, and wherein the remote computer or the remote service is configured to identify the respective electronic programmable device and perform the maintenance related action on the respective electronic programmable device; and wherein the cabinet further comprises separate doors for each of the at least two first compartments and the second compartment, and an indicator on each door of the at least two first compartments to indicate a status of the maintenance of the respective electronic programmable device in the at least two first compartments, the cabinet server further configured to transmit the indicated status to a user computing device associated with the respective electronic programmable device.

2. The system according to claim 1, wherein the first compartment further comprises a camera configured to capture a status of the user interface of the respective electronic programmable device, produce multimedia content related to a user interface of the respective electronic programmable device and provide the multimedia content to the remote computer or for the remote server.

3. The system according to claim 1, wherein the cabinet server is configured to store software for the respective electronic programmable device and to provide the software to the respective electronic programmable device via the cabinet communication network.

4. The system according to claim 1, wherein the first compartment further comprises a robotic arm configured to press keys on a keyboard or a select user selectable icons on a touch screen of the respective electronic programmable device.

5. The system according to claim 1, wherein the first and the second communication interfaces are physically connected via a same connector.

6. The system according to claim 1 wherein the at least two first compartments and the second compartment are arranged horizontally.

7. The system according to claim 1 wherein the at least two first compartments and the second compartment are arranged vertically.

8. The system according to claim 1 wherein the remote computer or remote server further includes a database of technical experts, the remote computer server or remote server being further configured to, after identifying the maintenance related action associated with the respective electronic programmable device, select a technical expert from the database of technical experts to perform the maintenance related action on the respective electronic programmable device, and enable the technical expert to utilize the remote computer or remote server to perform the maintenance related action.

9. The system according to claim 1, wherein the indicator configured to indicate the status of the maintenance related action presents the status as a textual message sent to a user device of an operator of the remote computer indicating a percentage of completion of the maintenance related action.

10. The system according to claim 1 wherein a shape of the cabinet is one of cubical, cuboidal or cylindrical.

11. The system according to claim 1 wherein dimensions of the at least two first compartments are different from dimension of the second compartment.

* * * * *